United States Patent
Nagamatsu et al.

(10) Patent No.: US 12,085,228 B2
(45) Date of Patent: Sep. 10, 2024

(54) TANK

(71) Applicant: Toray Industries, Inc., Tokyo (JP)

(72) Inventors: Daisuke Nagamatsu, Nagoya (JP); Naoya Ouchiyama, Nagoya (JP); Akihiko Matsui, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 113 days.

(21) Appl. No.: 17/911,984

(22) PCT Filed: Mar. 15, 2021

(86) PCT No.: PCT/JP2021/010286
§ 371 (c)(1),
(2) Date: Sep. 15, 2022

(87) PCT Pub. No.: WO2021/193180
PCT Pub. Date: Sep. 30, 2021

(65) Prior Publication Data
US 2023/0134272 A1   May 4, 2023

(30) Foreign Application Priority Data
Mar. 26, 2020  (JP) .................. 2020-055302

(51) Int. Cl.
*F17C 1/06* (2006.01)
*B29C 70/32* (2006.01)
(Continued)

(52) U.S. Cl.
CPC .............. *F17C 1/06* (2013.01); *B29C 70/32* (2013.01); *F16J 12/00* (2013.01);
(Continued)

(58) Field of Classification Search
CPC ............... F17C 1/06; F17C 2203/0604; F17C 2203/0673; F17C 2209/2154; F17C 1/16;
(Continued)

(56) References Cited

U.S. PATENT DOCUMENTS 11,384,902 B2     7/2022  Watanabe et al.
2013/0217805 A1   8/2013  Hayashi et al.
(Continued)

FOREIGN PATENT DOCUMENTS

| | | |
|---|---|---|
| JP | 9-280496 A | 10/1997 |
| JP | 2012-140997 A | 7/2012 |
| JP | 2012-197414 A | 10/2012 |
| JP | 2015-209887 A | 11/2015 |
| JP | 2017-7104 A | 1/2017 |

OTHER PUBLICATIONS

International Search Report dated Apr. 27, 2021, of corresponding International Application No. PCT/JP2021/010286 along with an English translation.

*Primary Examiner* — Shawn M Braden
(74) *Attorney, Agent, or Firm* — DLA Piper LLP (US)

(57) ABSTRACT

A tank includes a liner including an inner shell; and a reinforcing layer covering an outer surface of the liner; wherein the reinforcing layer is formed by continuously winding resin-impregnated fiber bundles around the liner, the reinforcing layer includes a hoop layer placed in a side of the liner, and a helical layer, gaps are formed between adjacent bundles of the resin-impregnated fiber bundles wound in the hoop layer, there is at least one site where the resin-impregnated fiber bundles are wound without forming a gap between adjacent bundles in the helical layer, and resin in the resin-impregnated fiber bundles has a resin toughness value of not less than 1.0 MPa·m$^{0.5}$.

8 Claims, 6 Drawing Sheets

(51) Int. Cl.
   *F16J 12/00* (2006.01)
   *B29L 31/00* (2006.01)
(52) U.S. Cl.
   CPC ............ *B29L 2031/7156* (2013.01); *F17C 2201/0109* (2013.01); *F17C 2203/012* (2013.01); *F17C 2203/0604* (2013.01); *F17C 2203/0624* (2013.01); *F17C 2203/0673* (2013.01); *F17C 2209/2154* (2013.01); *F17C 2221/011* (2013.01); *F17C 2221/012* (2013.01); *F17C 2221/014* (2013.01); *F17C 2221/016* (2013.01); *F17C 2221/033* (2013.01); *F17C 2270/0105* (2013.01); *F17C 2270/0168* (2013.01); *F17C 2270/0186* (2013.01); *F17C 2270/025* (2013.01)

(58) Field of Classification Search
   CPC ........ F17C 2203/067; F17C 2223/0123; F17C 2223/0153; F17C 2223/036; B29C 70/32; B29C 70/16
   See application file for complete search history.

(56) References Cited

U.S. PATENT DOCUMENTS

| | | | |
|---|---|---|---|
| 2017/0136716 A1* | 5/2017 | Shindo | B29C 53/562 |
| 2018/0283609 A1* | 10/2018 | Teruhira | B29C 53/582 |
| 2019/0120429 A1* | 4/2019 | Iida | F16J 12/00 |
| 2020/0224823 A1* | 7/2020 | Hatta | B29C 63/08 |

* cited by examiner

TANK

TECHNICAL FIELD

This disclosure relates to a tank made of a fiber reinforced plastic (FRP).

BACKGROUND

An FRP is a composite material prepared by reinforcing a resin with reinforcing fibers. FRPs are widely used since they are capable of exerting strength and rigidity that are equivalent to or higher than those of metallic materials such as iron and aluminum while having less weights compared to the metallic materials.

FRPs can be formed into various shapes such as flat panel shapes, H shapes, and cylindrical shapes. In particular, tanks to be used for storing a high-pressure gas or a liquid are generally produced by filament winding molding. The filament winding molding method is a molding method in which a fiber bundle wound on a bobbin is continuously unwound while applying tension thereto, and the fiber bundle is impregnated with a thermosetting resin, followed by winding the fiber bundle on a liner to form a reinforcing layer.

In a tank prepared by the filament winding molding method, the presence of gaps between fiber bundles during molding may lead to decreased pressure resistance. Therefore, in general, the molding is carried out in a state where adjacent fiber bundles overlap with each other such that no gap is formed between fibers. However, in that method, irregularity occurs between portions where fiber bundles are overlapping and portions where fiber bundles are not overlapping, leading to a difference in the tension applied to the fiber bundles. This produces slack in fiber bundles to which lower tension is applied, resulting in disturbance of the alignment of the fiber bundles. As a result, the pressure resistance of the tank may decrease.

Therefore, for example, JP 2015-209887 A proposes a method in which the mode of overlapping of fiber bundles is improved to prevent occurrence of irregularity due to overlapped fiber bundles, wherein fiber bundles having different thicknesses in the width direction are provided and molding is carried out such that thinner portions of the fiber bundles overlap with each other. Further, JP 2012-140997 A proposes a method in which flat fiber bundles are deformed into a square shape to prevent formation of gaps between bands during molding. Further, JP 2017-7104 A proposes a method of detecting gaps between bands during filament winding molding.

However, under circumstances requiring a high production rate, it is difficult to wind fiber bundles as in JP 2015-209887 A such that their side surfaces are joined together to prevent formation of gaps, or to deform flat fiber bundles into a square shape in the process as in JP 2012-140997 A. Further, in a method of detecting gaps between fiber bundles during filament winding molding as described in JP 2017-7104 A, a detection apparatus is necessary so that the cost of the tank may increase.

It could therefore be helpful to provide an inexpensive tank for which the conventional operation of accurately arranging fiber bundles, an apparatus for detecting gaps between resin-impregnated fiber bundles and the like are not required.

SUMMARY

We thus provide:

A tank comprising:
a liner which is an inner shell; and
a reinforcing layer covering the outer surface of the liner; wherein
the reinforcing layer is formed by continuously winding resin-impregnated fiber bundles around the liner,
the reinforcing layer comprises a hoop layer placed in the liner side, and a helical layer, gaps are formed between adjacent bundles of the resin-impregnated fiber bundles wound in the hoop layer,
there is at least one site where the resin-impregnated fiber bundles are wound without forming a gap between adjacent bundles in the helical layer, and
the resin constituting the tank has a resin toughness value of not less than $1.0 \text{ MPa·m}^{0.5}$.

The gaps are preferably formed only in the hoop layer in contact with the liner.

The ratio of the total of the areas exposed from the gaps formed between adjacent bundles of the resin-impregnated fiber bundles wound in the hoop layer, to the barrel surface area of the liner is preferably more than 0% and less than 50%.

The tank preferably satisfies:

$$0 \leq L\text{min}/W < 0.5 \text{ and } 0.01 < L\text{max}/W < 0.5$$

wherein Lmin represents the minimum value (mm) of the gaps; Lmax represents the maximum value (mm) of the gaps; and W represents the average width (mm) of the resin-impregnated fiber bundles adjacent to the gaps.

The Lmin and W of the tank preferably satisfy:

$$0.01 < L\text{min}/W < 0.5.$$

The weight ratio of the resin contained in the reinforcing layer is preferably 21% to 30%.

The resin contained in the resin-impregnated fiber bundles preferably has a resin viscosity of 10 to 150 Pa·s at 25° C.

We thus provide an inexpensive tank for which the conventional operation of accurately arranging resin-impregnated fiber bundles, an apparatus for detecting gaps between resin-impregnated fiber bundles and the like are not required.

DESCRIPTION OF SYMBOLS

Figure 1:
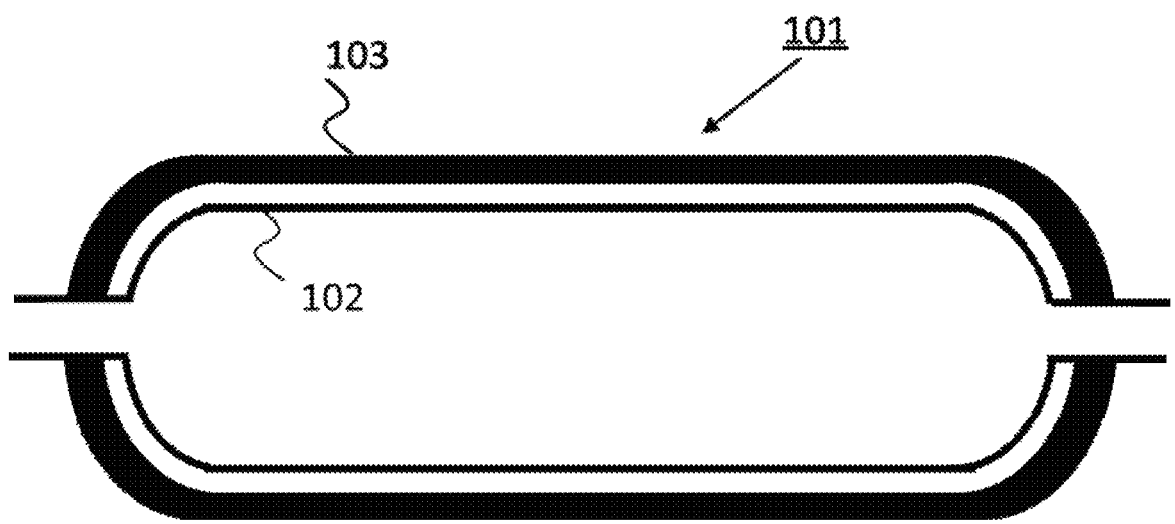
FIG. 1 is a schematic diagram illustrating one example of a cross-sectional view of a tank.

101: Tank
102: Liner
103: Reinforcing layer
201: Hoop layer
202: Circumferential direction
203: Helical layer
204: Tank axial direction
401: Tangent line
402: Gap between resin-impregnated fiber bundles
403: Resin-impregnated fiber bundle
601: Largest gap between resin-impregnated fiber bundles
602: Liner axial direction
603: Smallest gap between the resin-impregnated fiber bundles along the same axial direction as in 601
604: Circumferential direction of the liner
605: Overlap of resin-impregnated fiber bundles
701: Molding flow
702: Bobbin
703: Fiber bundle
704: Creel roller
705: Resin impregnation roller
706: Resin impregnation tank
707: Guide roller
708: Feed Eye
709: Fixed shaft

DETAILED DESCRIPTION

Examples of our tanks are described below in order. The examples are merely representative, and this disclosure is not limited to the examples.

Our tank 101 comprises:
a liner 102 which is an inner shell; and
a reinforcing layer 103 covering the outer surface of the liner 102,
wherein
the reinforcing layer 103 is formed by continuously winding resin-impregnated fiber bundles 403 around the liner 102,
the reinforcing layer 103 comprises a hoop layer 201 placed in the liner 102 side, and a helical layer 203,
gaps 402 are formed between adjacent bundles of the resin-impregnated fiber bundles wound in the hoop layer 201,
there is at least one site where the resin-impregnated fiber bundles 403 are wound without forming a gap between adjacent bundles in the helical layer 203, and
the resin constituting the tank 101 has a resin toughness value of not less than $1.0$ MPa·m$^{0.5}$.

FIG. 1 illustrates a cross-sectional view of the tank 101. The liner 102 comprises: a barrel part having a cylindrical shape; and dome parts having a domed shape provided at both ends of the barrel part, wherein each dome part is connected to an aperture. For the tank 101, it is preferred to use a material having gas permeability resistance such as aluminum, a steel, or a resin to retain a gas filled in the tank.

The reinforcing layer 103 is formed by continuously winding resin-impregnated fiber bundles around the liner 102, and capable of exerting pressure resistance of the tank 101.

The reinforcing layer 103 comprises a hoop layer placed in the liner 102 side, and a helical layer. By combining necessary numbers of hoop layers and helical layers at necessary angles to achieve a necessary thickness, a necessary pressure resistance can be exerted. The hoop layer and the helical layer are now described.

Figure 2A:
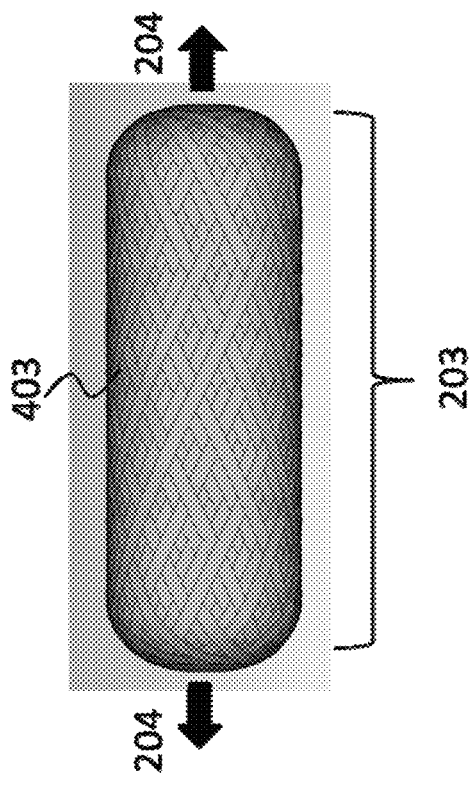
FIG. 2(a) is a schematic diagram illustrating one example of a hoop layer of a tank.
Figure 2B:
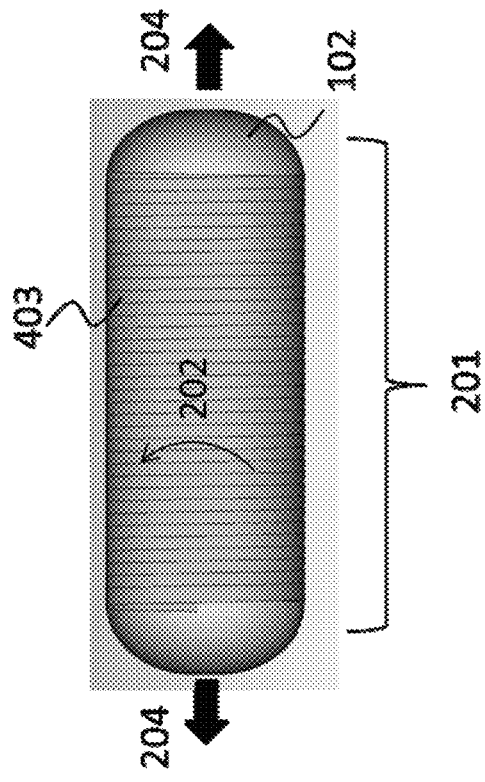
FIG. 2(b) is a schematic diagram illustrating one example of a helical layer of a tank.

FIG. 2(*a*) is a schematic diagram illustrating one example of the hoop layer 201. The hoop layer 201 is formed by winding and layering resin-impregnated fiber bundles 403 around the cylindrical barrel part of the liner 102 at an angle(s) of 80° to 110° with respect to the axial direction 204 of the liner. Resin-impregnated fiber bundles are wound from one end to the other end of the barrel part at, for example, the layering angle shown in FIG. 2(*a*) to cover the whole barrel part. This molding pattern is defined as hoop winding, and this unit is regarded as one layer. By repeating the hoop winding, a necessary hoop layer thickness is obtained. The pressure resistance of the tank in the circumferential direction 202 is dependent on the thickness of the hoop layer 201 deposited.

FIG. 2(*b*) is a schematic diagram illustrating one example of the helical layer 203. The helical layer 203 is formed by winding and layering resin-impregnated fiber bundles 403 at an angle(s) of more than 0° and less than 80°, or more than 110° and less than 180° with respect to the axial direction 204 of the liner. The molding pattern in which the dome parts and the barrel part are entirely covered at the layering angle is defined as helical winding, and this unit is regarded as one layer. By repeating the helical winding, a necessary helical layer thickness is obtained. The pressure resistance of the tank in the axial direction 204 is dependent on the thickness of the helical layer 203 deposited.

Figure 3:
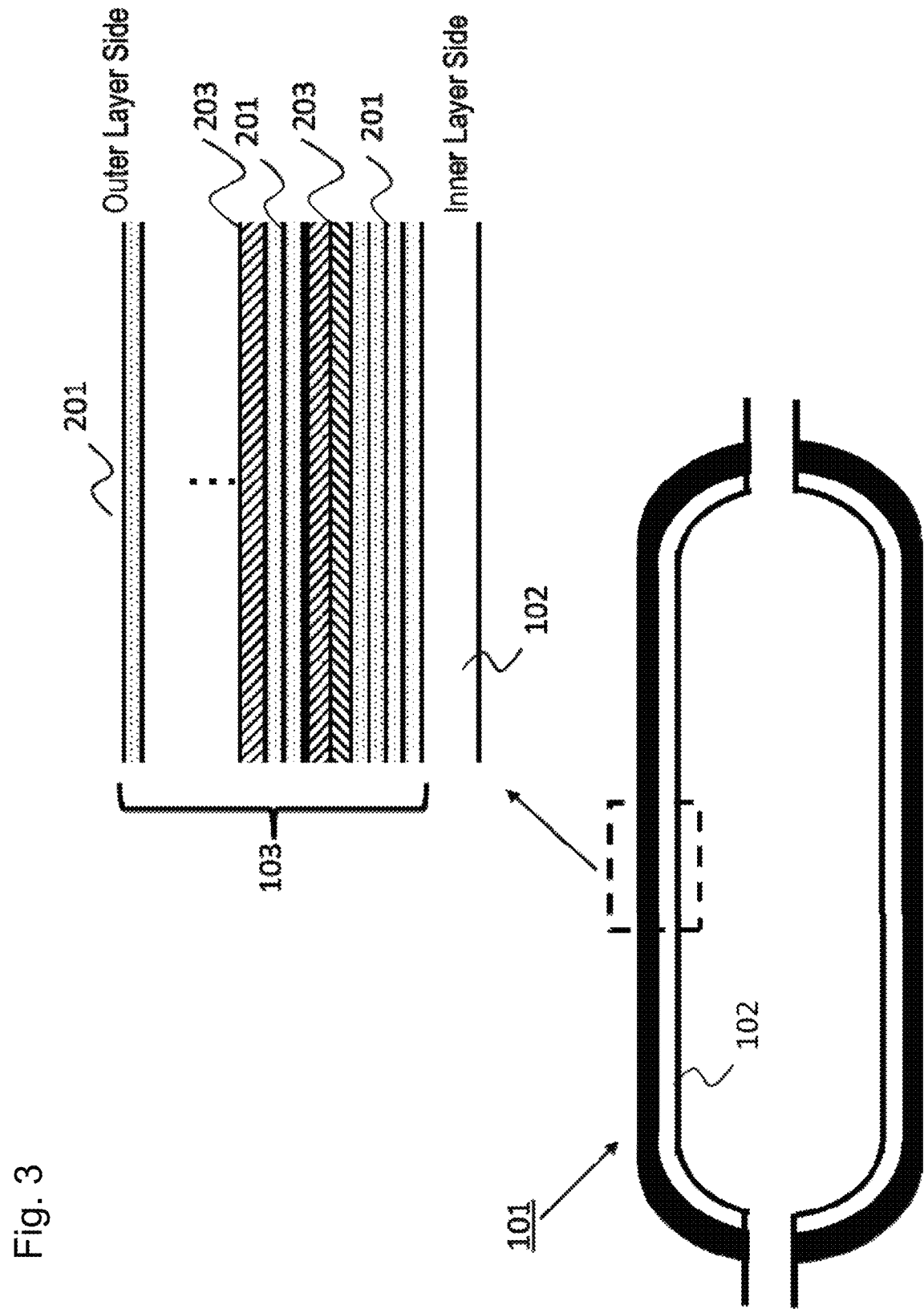
FIG. 3 is a schematic diagram illustrating one example of a laminated structure of a tank.

Thus, by combination of the hoop layer 201 and the helical layer 203, the tank 101 illustrated in FIG. 3 is prepared.

It is important to form gaps 402 between adjacent bundles of the resin-impregnated fiber bundles wound in the hoop layer 201, and provide at least one site where the resin-impregnated fiber bundles 403 are wound without forming a gap between adjacent bundles in the helical layer 203.

To secure safety upon fracture of the tank 101, in some instances, the fracture origin is required to be in the barrel part as described in KHKS0121 (2016). To satisfy this requirement, the reinforcing layer 103 is generally designed to have a thickness at which the pressure generated in the reinforcing layer 103 during filling with gas is higher in the circumferential direction 202 of the tank than in the axial direction 204 of the tank such that the fracture origin is in the barrel part.

Therefore, when the resin-impregnated fiber bundles 403 in the hoop layer 201 are not uniformly wound, in other words, when the alignment is disturbed, strength expression of the resin-impregnated fiber bundles 403 may be insufficient so that the fracture expected by the design may not necessarily occur in the barrel part. In particular, when the resin-impregnated fiber bundles 403 wound around the liner 102 overlap with each other, a difference in the tension occurs between portions where the resin-impregnated fiber bundles 403 are overlapping and portions where the resin-impregnated fiber bundles 403 are not overlapping. This leads to looseness of the resin-impregnated fiber bundles 403 having low tension, resulting in disturbance of the alignment. Therefore, it is important to form gaps 402 between adjacent bundles of the resin-impregnated fiber bundles wound in the hoop layer 201. Without such a configuration, the overlap between the resin-impregnated fiber bundles 403 cannot be eliminated so that the orderly fiber alignment cannot be achieved due to the difference in the tension of the resin-impregnated fiber bundles 403.

Further, it is important to provide at least one site where the resin-impregnated fiber bundles 403 are wound without forming a gap between adjacent bundles in the helical layer 203. Although the providing of the gaps in the helical layer 203 is useful to achieve the orderly fiber alignment, the presence of a large amount of gaps leads to formation of connected gaps as a large defect, and such a defect acts as an origin to decrease the pressure resistance of the tank 101. During filling with gas, the pressure that acts on the helical layer 203 is lower than the pressure that acts on the hoop layer 201. Therefore, disturbance of the fiber alignment of the helical layer 203 does not lead to fracture of the tank 101. Thus, it is important to provide at least one site where the resin-impregnated fiber bundles are wound without forming a gap between adjacent bundles in the helical layer 203. Without such a configuration, the formation of connected gaps in the whole reinforcing layer 103 cannot be prevented.

Further, it is important that the resin constituting the tank 101 has a resin toughness value of not less than 1.0 MPa·m$^{0.5}$. The resin toughness value is preferably not less than 1.4 MPa·m$^{0.5}$. When the resin toughness value is less than 1.0 MPa·m$^{0.5}$, a gap between the resin-impregnated fiber bundles 403 acts as a fracture origin so that the pressure resistance of the tank 101 decreases. The upper limit of the resin toughness value is preferably 3.0 MPa·m$^{0.5}$, more preferably 2.6 MPa·m$^{0.5}$. When the upper limit of the resin toughness value is within the preferred range described above, propagation of cracks generated upon application of a pressure can be suppressed and, therefore, the pressure resistance required for the tank 101 can be easily secured.

Further, the gaps 402 between the resin-impregnated fiber bundles are preferably formed only in the hoop layer 201 in contact with the liner 102. The pressure generated in the tank reinforcing layer 103 upon filling with gas is higher in the inner layer than in the outer layer, and the highest pressure is applied to the layer in contact with the liner 102. Thus, the hoop layer 201 is preferably placed on the contact surface with the liner 102, which contact surface acts as the fracture origin. In the outer side of the helical layer 203 placed on the innermost hoop layer 201 in the reinforcing layer, gaps between resin-impregnated fiber bundles 403 do not necessarily need to be formed in either a hoop layer 201 or a helical layer 203. This is because, since the pressure applied to the reinforcing layer is lower in the outer-side layers than in the innermost layer, the effect of disturbance of the alignment of the resin-impregnated fiber bundles 403 on the pressure resistance is low.

The ratio of the total of the areas exposed from the gaps formed between adjacent bundles of the resin-impregnated fiber bundles 403 wound in the hoop layer 201 ("gap area between fiber bundles"), to the barrel surface area of the liner 102 as the inner shell is preferably more than 0% and less than 50%. The ratio is more preferably more than 0.01% and less than 45%. When the ratio is within the preferred range described above, gaps can be secured in the hoop layer 201 while formation of a large defect by the gaps in the hoop layer 201 is unlikely so that a decrease in the pressure resistance can be effectively prevented.

Figure 4:
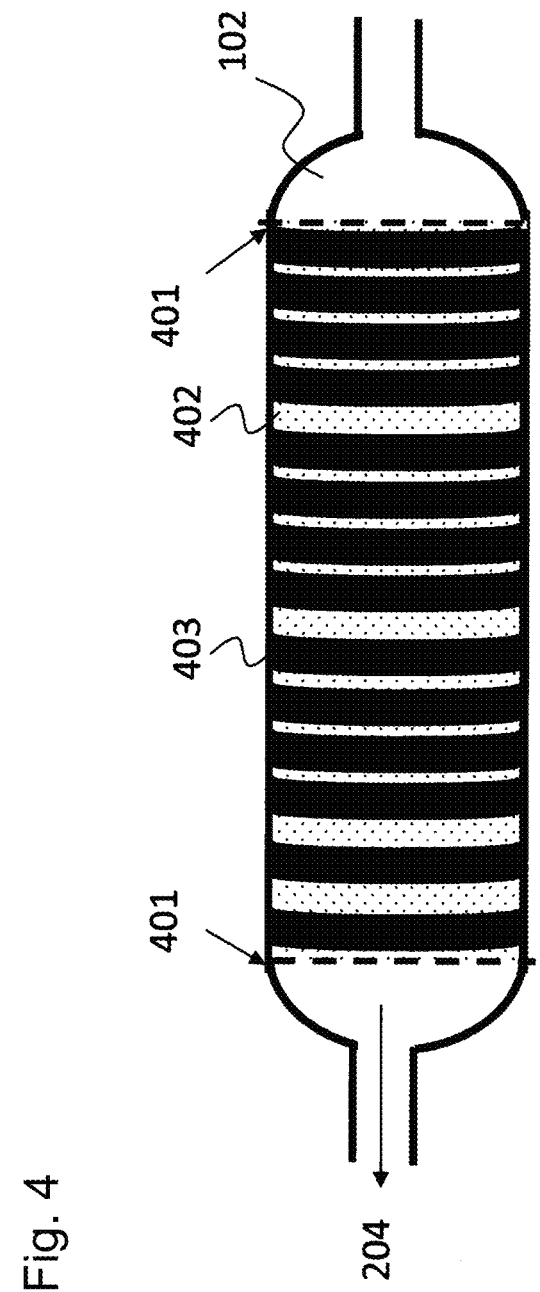
FIG. 4 is a schematic diagram illustrating one example of a tank comprising a hoop layer in contact with a liner, wherein fiber bundle gaps are formed in the hoop layer.

Methods of measuring the gap area between the fiber bundles and the barrel area of the liner 102 as the inner shell are described using FIG. 4. The liner 102 comprises: a barrel part having a cylindrical shape, positioned in the inner side of tangent lines 401 which are the border lines between the straight barrel part of the tank and curved surfaces; and dome parts having a domed shape, provided at both ends of the barrel part, wherein each dome part is connected to an aperture. The barrel area of the liner 102 is the area of the barrel part having a cylindrical shape positioned in the inner side of tangent lines 401, and the area of the gaps 402 between the resin-impregnated fiber bundles is determined by subtracting the wound area of the resin-impregnated fiber bundles 403 from the barrel area. These areas can be measured by temporarily stopping the filament winding molding machine during the winding of the resin-impregnated fiber bundles 403 around the liner 102.

After acquiring an appearance image of the liner 102, the gap area between the fiber bundles and the barrel area of the liner as the inner shell are calculated using imaging software, a measure or the like. When the areas are calculated based on an image, the calculation may be carried out by an automatic program using an algorithm such as the color difference, or by visual trimming of the image. It is not necessary to use a single image covering the whole liner 102, and a plurality of images may be used by connecting them. When the measurement of the gaps 402 between the resin-impregnated fiber bundles is impossible during the molding, the tank after curing may be decomposed to measure the widths of the resin-impregnated fiber bundles 403 and the gaps 402 between the resin-impregnated fiber bundles.

More specifically, the tank 101 is cut along the axial direction 204 of the tank to separate the liner 102 from the reinforcing layer 103, and then an image of the reinforcing layer 103 is acquired from the liner 102 side. Thereafter, the gap area between the fiber bundles and the barrel area of the liner 102 as the inner shell are calculated. As long as the shape of the reinforcing layer 103 is retained, the separation of the reinforcing layer 103 may be carried out by applying a force between layers or blowing away the resin by application of heat.

Our tanks preferably satisfy:

$$0 \leq Lmin/W < 0.5 \text{ and } 0.01 < Lmax/W < 0.5$$

wherein Lmin represents the minimum value (mm) of the gaps 402 between the resin-impregnated fiber bundles formed in the reinforcing layer 103; Lmax represents the maximum value (mm) of the gaps 402 between those resin-impregnated fiber bundles; and W represents the average width (mm) of the resin-impregnated fiber bundles 403 adjacent to the gaps 402 between those resin-impregnated fiber bundles. When Lmin/W and Lmax/W satisfy the preferred lower limits described above, sites where the resin-impregnated fiber bundles 403 overlap with each other are less likely to be formed even by changes in the fiber bundle width due to looseness of the wound resin-impregnated fiber bundles 403 or by shifts of the positions of the resin-impregnated fiber bundles 403 due to bleed out of the resin during curing. Therefore, the gaps 402 between the resin-impregnated fiber bundles can be stably formed. When Lmin/W and Lmax/W satisfy the preferred upper limits described above, large defects are less likely to be formed by the gaps 402 between the resin-impregnated fiber bundles so that a decrease in the pressure resistance can be effectively prevented. The lower limit of Lmin/W is more preferably higher than 0.01, still more preferably higher than 0.05. The lower limit of Lmax/W is more preferably higher than 0.05, still more preferably higher than 0.06. The upper limit of Lmin/W is more preferably lower than 0.45, still more preferably lower than 0.4. The upper limit of Lmax/W is more preferably lower than 0.45, still more preferably lower than 0.4.

Figure 5:
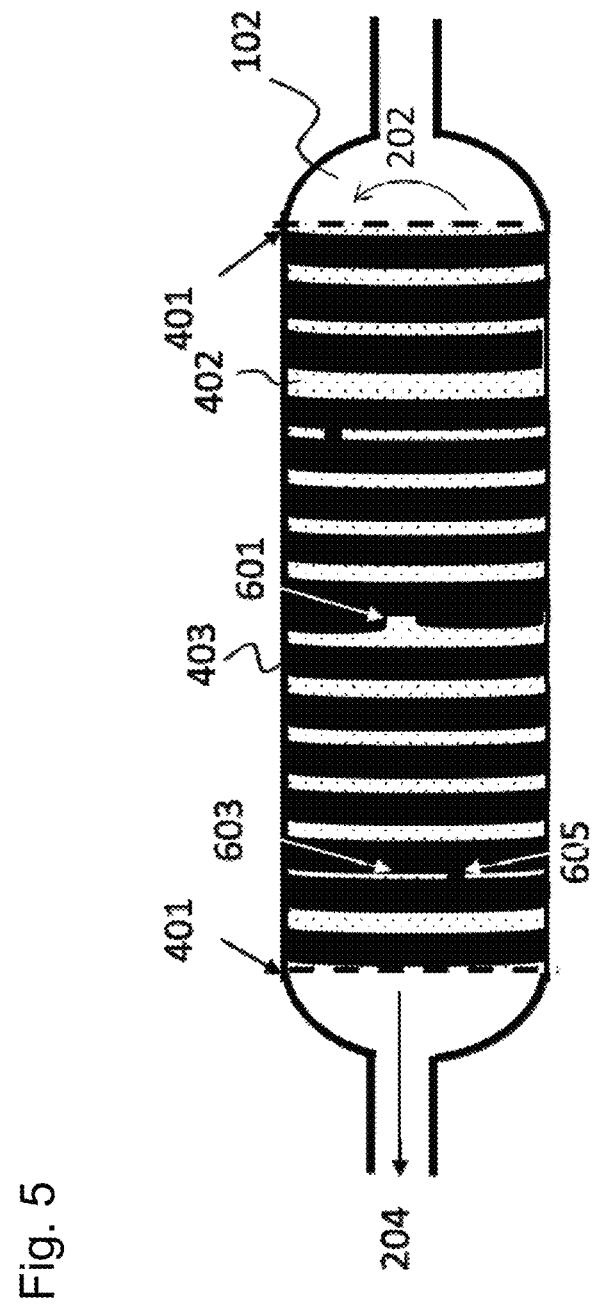
FIG. 5 is a schematic diagram illustrating one example of a tank comprising a hoop layer in contact with a liner, wherein the hoop layer has one or more sites where no fiber bundle gap is formed.

The methods of measuring the gaps 402 between the resin-impregnated fiber bundles and the widths of the resin-impregnated fiber bundles 403 are described using FIG. 5. The gaps 402 between the resin-impregnated fiber bundles and the widths of the resin-impregnated fiber bundles 403 can be measured by temporarily stopping the filament winding molding machine during the winding of the resin-impregnated fiber bundles 403 around the liner 102. After visually finding the largest gap 601 between the resin-impregnated fiber bundles ("largest gap"), the gap is measured. The method of the measurement is not limited as long as the gap can be measured, and examples of the method include use of a caliper of a laser sensor. Using the found largest gap as the starting point, gaps 402 between the resin-impregnated fiber bundles are observed along the axial direction 204 of the liner. The width of the largest gap 601 described above is defined as Lmax, and the width of the smallest gap 603 between the resin-impregnated fiber bundles along the same axial direction 204 as in the largest gap 601 ("smallest gap") is defined as Lmin. Subsequently, the widths of the resin-impregnated fiber bundles 403 adjacent to the largest gap 601 are measured (at two sites), and the widths of the resin-impregnated fiber bundles 403 adjacent to the smallest gap 603 are measured by the same method. The measured values of the widths at the four sites are averaged to provide the average width W of the resin-impregnated fiber bundles 403. Thereafter, Lmin/W and Lmax/W are calculated using the Lmin, Lmax, and W obtained. When an overlap 605 is present between the resin-impregnated fiber bundles along the axial direction 204 of the liner, Lmin is defined as 0. When Lmin is 0, the average width W of the resin-impregnated fiber bundles 403 is the average of only the widths (at two sites) of the resin-impregnated fiber bundles 403 adjacent to the largest gap. Further, when no gap is present between resin-impregnated fiber bundles 403 and the largest gap 601 of the resin-impregnated fiber bundles, the average width W of the resin-impregnated fiber bundles 403 is defined as "none". When the average width W of the resin-impregnated fiber bundles 403 is "none", Lmin/W and Lmax/W at the measurement site are defined as no value. Subsequently, a point rotationally shifted at an angle of about 1° in the circumferential direction 202 of the liner from the gap used as the starting point of the measurement is used as a starting point from which Lmin/W and Lmax/W are measured along the axial direction 204 of the liner by the method described above. This measurement is repeated for the entire circumference in the circumferential direction 202 of the liner, and the minimum Lmin/W and the maximum Lmax/W are determined among all obtained measured values. When no gap is present between the resin-impregnated fiber bundles 403 at any of the measurement sites, both Lmin/W and Lmax/W are defined as 0.

Further, the weight ratio of the resin contained in the reinforcing layer 103 (=the weight of the matrix resin in the resin-impregnated fiber bundles 403/the whole weight of the resin-impregnated fiber bundles 403) is preferably 21 to 30%. The weight ratio of the resin contained in the reinforcing layer 103 is more preferably 22.5% to 28.5%. When the weight ratio of the resin contained in the reinforcing layer 103 is within the preferred range described above, the amount of the resin in the resin-impregnated fiber bundles 403 is sufficient so that the gaps formed between the resin-impregnated fiber bundles 403 are unlikely to remain as voids, and a decrease in the pressure resistance can therefore be effectively prevented. On the other hand, in such configurations, the resin-impregnated fiber bundles 403 are unlikely to expand during winding of the fiber bundles around the liner so that the gaps can be easily stably formed.

The resin viscosity of the resin is preferably 10 to 150 Pa·s at 25° C. When the resin viscosity is within the preferred range described above, the resin-impregnated fiber bundles 403 are unlikely to expand during winding of the fiber bundles around the liner so that the gaps can be easily stably formed. On the other hand, since resin impregnation can be easily allowed to proceed, the gaps formed between the resin-impregnated fiber bundles 403 hardly remain as voids so that a decrease in the pressure resistance can be effectively prevented.

The fiber bundles and the resin are described below.

Examples of the fibers constituting the fiber bundles include glass fibers, carbon fibers, graphite fibers, aramid fibers, boron fibers, alumina fibers, and silicon carbide fibers. A mixture of two or more kinds of these reinforcing fibers may also be used. Preferably, to obtain a molding having higher strength, carbon fibers are used as the fiber bundles.

Any type of carbon fibers may be used depending on the use. From the viewpoint of obtaining a molding having higher strength, carbon fibers having a tension modulus of 3 to 8 GPa in a strand tension test according to the method described in JIS R 7601 (1986) are preferably used.

The resin is preferably a liquid-form resin. More specifically, from the viewpoint of obtaining the heat resistance and the environmental resistance required for the tank, the resin is preferably an epoxy resin composition containing an epoxy resin and a hardener. Further, when appropriate, a curing catalyst may be added for reducing the curing time.

Figure 6:
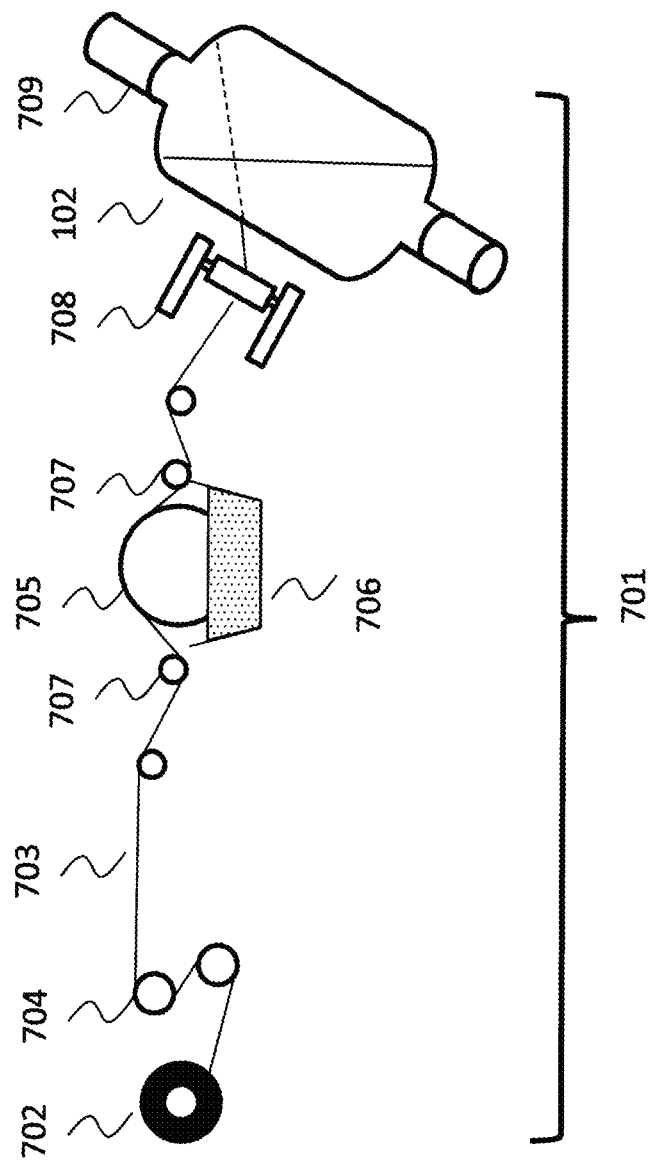
FIG. 6 is a schematic diagram illustrating one example of a production process of a tank.

One example of the filament winding molding machine is illustrated in FIG. 6. FIG. 6 is a schematic diagram illustrating the entire configuration of one example of a molding flow in the method of producing the tank.

The molding flow 701 mainly illustrates that:
a creel roller 704 that plays a role in a sending process for sending a fiber bundle 703 from a bobbin 702;
a resin impregnation section that plays a role in a resin impregnation process for impregnating the fiber bundle 703 with a resin, the section comprising a resin impregnation roller 705, a resin impregnation tank 706, and a guide roller 707;
a feed eye 708 that plays a role in a winding process for winding the resin-impregnated fiber bundle 703;
a liner 102; and
a fixed shaft 709 that connects a molding machine to the liner 102,
are arranged in this order.

In FIG. 6, only one bobbin 702 is shown. However, the molding flow 701 is not limited to such a configuration, and a plurality of bobbins 702 may be arranged.

As the bobbin 702, a tow prepreg preliminarily impregnated with a resin in a separate process may be used. When a tow prepreg is used, the resin impregnation process can be omitted.

The tank produced can be preferably used not only for hydrogen gas vehicles and natural gas vehicles, but also for ships, aircraft and the like, stationary tanks immobilized on the ground, and air respirators to be used in hospitals or by firemen. Examples of substances that may be stored in this tank include gases such as nitrogen, oxygen, argon, liquefied petroleum gas, and hydrogen; and liquefied products of these substances.

EXAMPLES

Method of Evaluating Fracture Toughness Value of Resin Used for Tank

The uncured resin to be used for the tank was defoamed under vacuum, and was then cured for the lengths of time and at the temperatures described in Examples and Comparative Examples in a mold whose thickness was set to 6 mm using a spacer made of "TEFLON (registered trademark)" having a thickness of 6 mm to obtain resin hardened plates having a thickness of 6 mm. Each obtained resin hardened plate was processed into the test piece shape described in ASTM D5045-99, and then an SENB test was carried out according to ASTM D5045-99. The test was carried out for 16 samples (n=16), and the resulting average was employed as the fracture toughness value.

Method of Evaluating Resin Viscosity of Resin Used for Tank

The viscosity of the uncured resin to be used for the tank was measured according to the "method of measuring the viscosity with a cone-flat plate type rotational viscometer" in JIS Z8803 (2011) using an E-type viscometer (TVE-22HT, manufactured by Toki Sangyo Co., Ltd.) equipped with a standard cone rotor (1° 34'×R24), at 25° C. at a rotational speed of 5 rotations/minute. The viscosity was measured five times, and the resulting average was employed.

Method of Preparing Tow Prepreg

Using a tow prepreg production apparatus comprising a creel, a kiss-roll, a nip-roll, and a winder, one side of a carbon fiber "TORAYCA" (registered trademark) was coated with a resin composition whose temperature was adjusted to 25° C., and then the carbon fiber was passed through the nip-roll to allow impregnation of the inside of the fiber bundle with the resin composition, to thereby obtain a tow prepreg. Regarding the tow prepreg bobbin, 2300 m of the tow prepreg was wound around a paper core with an initial tension of 600 to 1000 gf at a winding ratio of 6 to 10 such that a cylindrical shape having a winding width of 230 to 260 mm was formed.

Methods of Measuring Gap Area between Fiber Bundles, and Barrel Area of Liner as Inner Shell After stopping the filament winding molding machine during molding, photographs of the liner on which resin-impregnated fiber bundles are wound are taken using a camera (IXY650, manufactured by Canon). This operation is carried out each time when the liner is rotated at 90°, 180°, and 270° in the circumferential direction, to take photographs. An acquired image is read using image processing software Image J. While visually identifying resin-impregnated fiber bundle portions, the area is calculated using polygon and Measure in this software. Subsequently, by the same method, the barrel area of the liner is calculated from the image. Thereafter, the area of the resin-impregnated fiber bundles is subtracted from the barrel area of the liner to calculate the gap area between the fiber bundles. By carrying out the same process, the gap area between the fiber bundles and the barrel area of the liner are calculated for each of the remaining acquired images. Finally, by averaging the calculated areas, the gap area between the fiber bundles and the barrel area of the liner were determined.

Calculation of Minimum Value Lmin of Gaps Between Resin-Impregnated Fiber Bundles, Maximum Value Lmax of Those Gaps, and Average Width W of Resin-Impregnated Fiber Bundles Adjacent to Those Gaps After stopping the filament winding molding machine during molding, the largest site is visually found, and the width of the site is measured using a caliper (Pocket Caliper 100 mm, manufactured by Shinwa Rules Co., Ltd.). Using this gap as a starting point, gaps between the resin-impregnated fiber bundles were observed along the axial direction of the liner. The maximum value (Lmax) of the gaps between the resin-impregnated fiber bundles and the minimum value (Lmin) of the gaps between the resin-impregnated fiber bundles were measured. Subsequently, the widths of the resin-impregnated fiber bundles adjacent to the Lmax are measured (at two sites), and the widths of the resin-impregnated fiber bundles adjacent to the Lmin are measured by the same method. The measured values of the widths at the four sites are averaged to provide the average width W of the resin-impregnated fiber bundles. However, when there is no minimum value (Lmin) of the gaps between the fiber bundles at the measurement site, the gap is defined as 0, and the average width of the resin-impregnated fiber bundles is defined as the average of only the widths (at two sites) of the resin-impregnated fiber bundles adjacent to the largest gap. Further, when no gap is present between resin-impregnated fiber bundles 403 and the largest gap 601 of the resin-impregnated fiber bundles, the average width of the resin-impregnated fiber bundles is defined as "none". When the average width of the resin-impregnated fiber bundles is "none", Lmin/W and Lmax/W at the measurement site are defined as no value, and not included in the measurement result.

Subsequently, a point rotationally shifted at an angle of about 1° in the circumferential direction of the liner from the gap used as the starting point is used as a starting point from which the gaps between the resin-impregnated fiber bundles are observed along the axial direction of the liner. The maximum value of the gaps between the resin-impregnated fiber bundles is defined as Lmax, and the minimum value of the gaps between the resin-impregnated fiber bundles is defined as Lmin. Thereafter, the width W of the resin-impregnated fiber bundles is measured by the method described above, and Lmin/W and Lmax/W are calculated. This measurement is repeated for the entire circumference of the liner, and the maximum Lmax/W and the minimum Lmin/W are calculated among the obtained results. When no gap is present between the resin-impregnated fiber bundles in the entire circumference of the measurement range, both Lmin/W and Lmax/W are defined as 0.

Method of Calculating Strength Utilization Rate

By the method described in KHKS0121 (2005), a water pressure was applied in the tank to perform a bursting test, to measure the pressure at the time of bursting. According to the equation of MIL-HDBK-17-3F Volume 3 of 5 17 Jun. 2002 5.3.5.3.1(e), the strength of the tank was calculated (theoretical strength), and the strength utilization rate of the tank was calculated according to the following equation.

Strength utilization rate (%)=(pressure at the time of bursting/theoretical strength)×100

Our tanks are described below in more detail by way of Examples.

Example 1

A resin composition was obtained by stirring and mixing 88 parts by mass of "JER (registered trademark)" 828, 12 parts by mass of "DENACOL (registered trademark)" EX821, 4 parts by mass of "HYPRO (registered trademark)" 1300λ8 as a carboxy-modified acrylic rubber, 17 parts by mass of "KANACE (registered trademark)" MX125, 7.4 parts by mass of DICY7T as dicyanodiamide, and 2.7 parts by mass of DCMU99 as an aromatic urea compound.

The fracture toughness value of this resin composition was evaluated according to the "Method of Evaluating Fracture Toughness Value of Resin Used for Tank". As a result, the fracture toughness value was found to be 2.1 MPa·m$^{0.5}$. Using this resin composition and carbon fibers "TORAYCA (registered trademark)" T910SC-36K-50C, a tow prepreg having a resin content of 24% was prepared.

The strand strength of the carbon fibers used was 6200 MPa. In the filament winding molding machine, a 7.5-L aluminum liner having an outer diameter of 160 mm was placed, and the tow prepreg was wound around the whole liner. As a first layer, a hoop layer was wound to a thickness of 0.79 mm at 89°/91° with respect to the axial direction of the liner. In this process, the tow prepreg was arranged such that adjacent tow prepregs did not overlap with each other to provide periodic gaps in the first layer. At this time, Lmin/W and Lmax/W were calculated according to the "Calculation of Minimum Value Lmin of Gaps between Resin-Impregnated Fiber Bundles, Maximum Value Lmax of Those Gaps, and Average Width W of Resin-Impregnated Fiber Bundles Adjacent to Those Gaps". As a result, Lmin/W was 0.1, and Lmax/W was 0.44. As a second layer, a helical layer was wound to a thickness of 1.07 mm at 18°/162° with respect to the axial direction of the liner. Further, as a third layer, a hoop layer was wound to a thickness of 0.52 mm at 89°/91° with respect to the axial direction of the liner to obtain an intermediate. The intermediate was cured at 150° C. for 2 hours with rotation in a curing furnace to obtain a tank.

The strength utilization rate of the obtained tank was calculated according to the "Method of Calculating Strength Utilization Rate". The strength utilization rate was 98.3%; the bursting pressure was 71.5 MPa; and the theoretical strength was 72.7 MPa.

Example 2

A resin composition was obtained by stirring and mixing 21 parts by mass of "JER (registered trademark)" 828, 67 parts by mass of "JER (registered trademark)" 806, 5 parts by mass of "EPOTOTO (registered trademark)" YDF-2001, 7 parts by mass of TETRAD-X as a xylene diamine type epoxy resin, 7 parts by mass of "KANACE (registered trademark)" MX-125, 5 parts by mass of DICY7T as dicyanodiamide, and 4 parts by mass of DCMU99 as an aromatic urea compound.

The fracture toughness value of this resin composition was evaluated according to the "Method of Evaluating Fracture Toughness Value of Resin Used for Tank". As a result, the fracture toughness value was found to be 1.6 MPa·m$^{0.5}$. Using this resin composition and carbon fibers "TORAYCA (registered trademark)" T720SC-36K-50C, a tow prepreg having a resin content of 24% was prepared. The strand strength of the carbon fibers used was 5800 MPa. In the filament winding molding machine, a 7.5-L aluminum liner having an outer diameter of 160 mm was placed, and the tow prepreg was wound around the whole liner. As a first layer, a hoop layer was wound to a thickness of 0.79 mm at 89°/91° with respect to the axial direction of the liner. At this time, Lmin/W and Lmax/W were calculated according to the "Calculation of Minimum Value Lmin of Gaps between Resin-Impregnated Fiber Bundles, Maximum Value Lmax of Those Gaps, and Average Width W of Resin-Impregnated Fiber Bundles Adjacent to Those Gaps". As a result, Lmin/W was 0.19, and Lmax/W was 0.45. As a second layer, a helical layer was wound to a thickness of 1.07 mm at 18°/162° with respect to the axial direction of the liner. Further, as a third layer, a hoop layer was wound to a thickness of 0.52 mm at 89°/91° with respect to the axial direction of the liner to obtain an intermediate. The intermediate was cured at 110° C. for 10 hours with rotation in a curing furnace to obtain a tank.

The strength utilization rate of the obtained tank was calculated according to the "Method of Calculating Strength Utilization Rate". The strength utilization rate was 108.5%; the bursting pressure was 73.8 MPa; and the theoretical strength was 68.0 MPa.

Example 3

A tank was prepared by the same method as in Example 1 except that 0.5-mm gaps were formed between the resin-impregnated fiber bundles of the hoop layer in the first layer during molding. In this process, width variation of the resin-impregnated fiber bundles led to five "sites where no gap was formed" in which the fiber bundles were overlapping in the hoop layer of the first layer. At this time, Lmin/W and Lmax/W were calculated according to the "Calculation of Minimum Value Lmin of Gaps between Resin-Impregnated Fiber Bundles, Maximum Value Lmax of Those Gaps, and Average Width W of Resin-Impregnated Fiber Bundles Adjacent to Those Gaps". As a result, Lmin/W was 0, and Lmax/W was 0.1.

Subsequently, the strength utilization rate of the obtained tank was calculated according to the "Method of Calculating Strength Utilization Rate". The strength utilization rate was 102.1%; the bursting pressure was 74.2 MPa; and the theoretical strength was 72.7 MPa.

Comparative Example 1

A tank was prepared by the same method as in Example 1 except that molding was carried out such that the resin-impregnated fiber bundles in the hoop layer of the first layer overlapped with each other by 2.5 mm each. At this time, since no gap was formed in the hoop layer of the first layer, both Lmin/W and Lmax/W were regarded as 0 according to the definition in the "Calculation of Minimum Value Lmin of Gaps between Resin-Impregnated Fiber Bundles, Maximum Value Lmax of Those Gaps, and Average Width W of Resin-Impregnated Fiber Bundles Adjacent to Those Gaps".

The strength utilization rate of the obtained tank was calculated according to the "Method of Calculating Strength Utilization Rate". The strength utilization rate was 90.6%; the bursting pressure was 65.9 MPa; and the theoretical strength was 72.7 MPa. Thus, the presence of overlapping resin-impregnated fiber bundles resulted in a decrease in the strength utilization rate.

Comparative Example 2

A resin composition was obtained by stirring and mixing 75 parts by mass of "JER (registered trademark)" 828, 40 parts by mass of GAN (manufactured by Nippon Kayaku Co., Ltd.), 8 parts by mass of DICY7T (manufactured by Mitsubishi Chemical Corporation) as a hardener, and 2 parts by mass of DCMU as a curing aid.

The fracture toughness value of this resin composition was evaluated according to the "Method of Evaluating Fracture Toughness Value of Resin Used for Tank". As a result, the fracture toughness value was found to be 0.72 MPa·m$^{0.5}$. Using this resin composition and carbon fibers "TORAYCA (registered trademark)" T720SC-36K-50C, a tow prepreg having a resin content of 24% was prepared. The strand strength of the carbon fibers used was 5800 MPa. In the filament winding molding machine, a 7.5-L aluminum liner having an outer diameter of 160 mm was placed, and the tow prepreg was wound around the whole liner. As a first layer, a hoop layer was wound to a thickness of 0.79 mm at 89°/91° with respect to the axial direction of the liner. At this time, Lmin/W and Lmax/W were calculated according to the "Calculation of Minimum Value Lmin of Gaps between Resin-Impregnated Fiber Bundles, Maximum Value Lmax of Those Gaps, and Average Width W of Resin-Impregnated Fiber Bundles Adjacent to Those Gaps". As a result, Lmin/W was 0.09, and Lmax/W was 0.32. As a second layer, a helical layer was wound to a thickness of 1.07 mm at 18°/162° with respect to the axial direction of the liner. Further, as a third layer, a hoop layer was wound to a thickness of 0.52 mm at 89°/91° with respect to the axial direction of the liner to obtain an intermediate. The intermediate was cured at 110° C. for 10 hours with rotation in a curing furnace to obtain a tank.

The strength utilization rate of the obtained tank was calculated according to the "Method of Calculating Strength Utilization Rate". The strength utilization rate was 79.0%; the bursting pressure was 53.7 MPa; and the theoretical strength was 68.0 MPa. These results indicate that, when gaps are formed between the resin-impregnated fiber bundles and the fracture toughness value is low, the strength utilization rate decreases.

The invention claimed is:

1. A tank comprising:
    a liner comprising an inner shell; and
    a reinforcing layer covering an outer surface of the liner;
    wherein
    the reinforcing layer is formed by continuously winding resin-impregnated fiber bundles around the liner,
    the reinforcing layer comprises a hoop layer placed in a side of the liner, and a helical layer,
    gaps are formed between adjacent bundles of the resin-impregnated fiber bundles wound in the hoop layer,
    there is at least one site where the resin-impregnated fiber bundles are wound without forming a gap between adjacent bundles in the helical layer, and
    resin in the resin-impregnated fiber bundles has a resin toughness value of not less than 1.0 MPa·m$^{0.5}$, wherein a ratio of a total of areas exposed from the gaps formed between adjacent bundles of the resin-impregnated fiber bundles wound in the hoop layer, to a barrel surface area of the liner is more than 0% and less than 50%.

2. A tank comprising:
    a liner comprising an inner shell; and
    a reinforcing layer covering an outer surface of the liner;
    wherein
    the reinforcing layer is formed by continuously winding resin-impregnated fiber bundles around the liner,
    the reinforcing layer comprises a hoop layer placed in a side of the liner, and a helical layer,
    gaps are formed between adjacent bundles of the resin-impregnated fiber bundles wound in the hoop layer,
    there is at least one site where the resin-impregnated fiber bundles are wound without forming a gap between adjacent bundles in the helical layer, and
    resin in the resin-impregnated fiber bundles has a resin toughness value of not less than 1.0 MPa·m$^{0.5}$, that satisfies:

$$0 \leq Lmin/W < 0.5 \text{ and } 0.01 < Lmax/W < 0.5$$

wherein Lmin represents a minimum value (mm) of the gaps, Lmax represents a maximum value (mm) of the gaps, and W represents an average width (mm) of the resin-impregnated fiber bundles adjacent to the gaps.

3. The tank according to claim 2, wherein Lmin and W satisfy:

$$0.01 < Lmin/W < 0.5.$$

4. The tank according to claim 1, wherein a weight ratio of the resin contained in the reinforcing layer is 21% to 30%.

5. The tank according to claim 1, wherein the resin contained in the resin-impregnated fiber bundles has a resin viscosity of 10 to 150 Pa·s at 25° C.

6. The tank according to claim 2, wherein the resin contained in the resin-impregnated fiber bundles has a resin viscosity of 10 to 150 Pa·s at 25° C.

7. The tank according to claim 1, wherein the gaps are formed only in the hoop layer in contact with the liner.

8. The tank according to claim 2, wherein the gaps are formed only in the hoop layer in contact with the liner.

* * * * *